United States Patent [19]
McColl

[11] 3,768,529
[45] Oct. 30, 1973

[54] ROUNDWOOD STUMP PROCESSOR

[75] Inventor: Bruce J. McColl, Whitby, Ontario, Canada

[73] Assignee: Owens-Illinois, Inc., Toledo, Ohio

[22] Filed: Oct. 7, 1971

[21] Appl. No.: 187,402

Related U.S. Application Data

[62] Division of Ser. No. 10,976, Feb. 12, 1970, Pat. No. 3,643,709.

[52] U.S. Cl. ............................. 144/309 AC, 144/3 D
[51] Int. Cl. ............................................. A01g 23/02
[58] Field of Search .................. 144/2 Z, 3 D, 34 R, 144/309 AC

[56] References Cited
UNITED STATES PATENTS

| | | | |
|---|---|---|---|
| 3,140,736 | 7/1964 | Propst | 144/3 D |
| 3,348,592 | 10/1967 | Winblad et al. | 144/3 D |
| 3,385,333 | 5/1968 | Eynon | 144/3 D |
| 3,557,849 | 1/1971 | Martinson | 144/3 D |

Primary Examiner—Gerald A. Dost
Attorney—Beveridge et al.

[57] ABSTRACT

A method for harvesting trees into sectioned pulpwood bolts by means of an extendable head-reach mechanism and processor pivotally supported on a mobile vehicle for arculate horizontal movement and vertical elevational movement about and with respect to the machine.

2 Claims, 20 Drawing Figures

Fig. 1

PATENTED OCT 30 1973 3,768,529

ROUNDWOOD STUMP PROCESSOR

This is a division, of application Ser. No. 10,976, filed Feb. 12, 1970, now U.S. Pat. No. 3,643,709 of Feb. 22, 1972.

This invention relates to tree harvesting and in particular to a machine for severing and processing trees into pulpwood at the stump location and the material handling of pulpwood to primary landings in the forest areas.

BACKGROUND

In present pulpwood operations in forest areas, the manual felling of trees by chainsaw is, generally speaking, still the order of the day. Subsequent to such manual felling, the trees are usually debranched and then skidded to a secondary landing for further processing and from where conventional transportation of the sectionalized trees may begin. However, recent improvements in such forest area operations have been provided by the advent of the "forwarder" type of material handling machine as disclosed in my Canadian Pat. No. 659,445 of Mar. 12th, 1963.

In combination with forwarders, trees which are felled manually or otherwise are debranched at the stump location and usually sectioned into eight foot bolts and then bunched at the primary landing, i.e., some thirty feet from the stump location. The forwarder gathers and loads the bolts and transports them over the cut areas to the secondary landing, i.e. on or adjacent to a branch road where the load is transferred by the forwarder to conventional truck transportation.

The object of this invention is to present a logical and novel step forward for a wide range of present forest production operations. This is achieved by providing a machine for (a) severing a tree from its stump; (b) debranching and sectionalizing the tree bole into desired bolt lengths; (c) collecting the bolts into a magazine as they are sectioned and then (d) depositing a full-magazine load at the primary landing in an orderly pile which can subsequently be transported to the secondary landing, for example by forwarder machines.

According to one aspect of the invention, an apparatus for processing trees comprises a high mobility, ground traversing vehicle; a head-reach mechanism mounted on one end of the vehicle and being pivotally connected thereto at its inner end for both vertical and horizontal movement with respect to the vehicle; a tree processing unit mounted at the outer end of the head-reach mechanism and including means to (a) grasp and sever a tree from its stump, (b) debranch the severed tree and (c) sectionalize the debranched tree into bolts of a desired length; and means carried by the processing unit for receiving storing and depositing the pulpwood bolts.

Although the roundwood operations described in this application can be related to any desired length of pulpwood bolt, the disclosure by way of example will be directed to eight foot pulpwood.

The invention is illustrated by way of example in the accompanying drawings in which.

GENERAL DESCRIPTION

Figure 1:
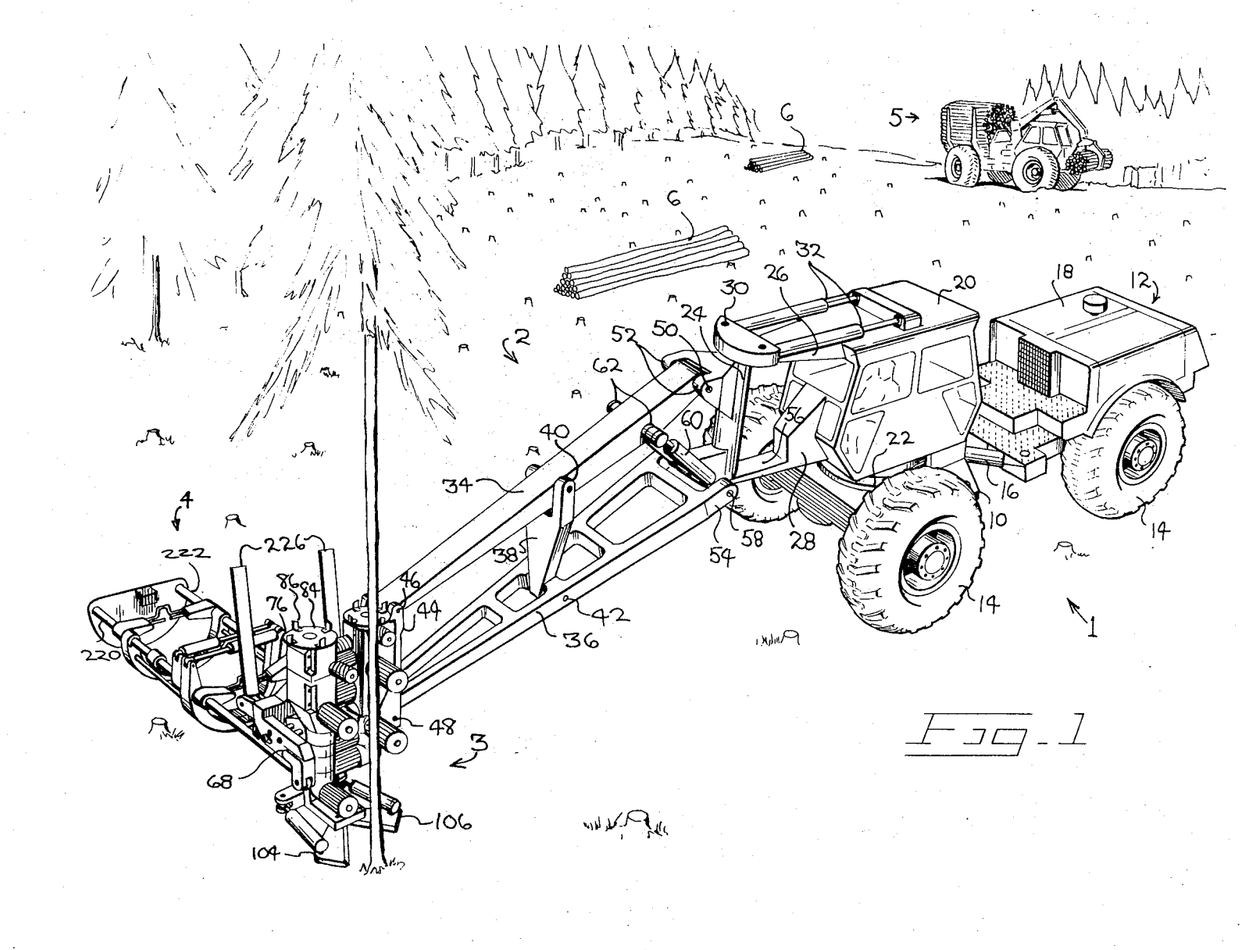
FIG. 1 is a perspective view of the machine according to the invention and illustrates the processing unit approaching a tree grasping position.
Figure 2:
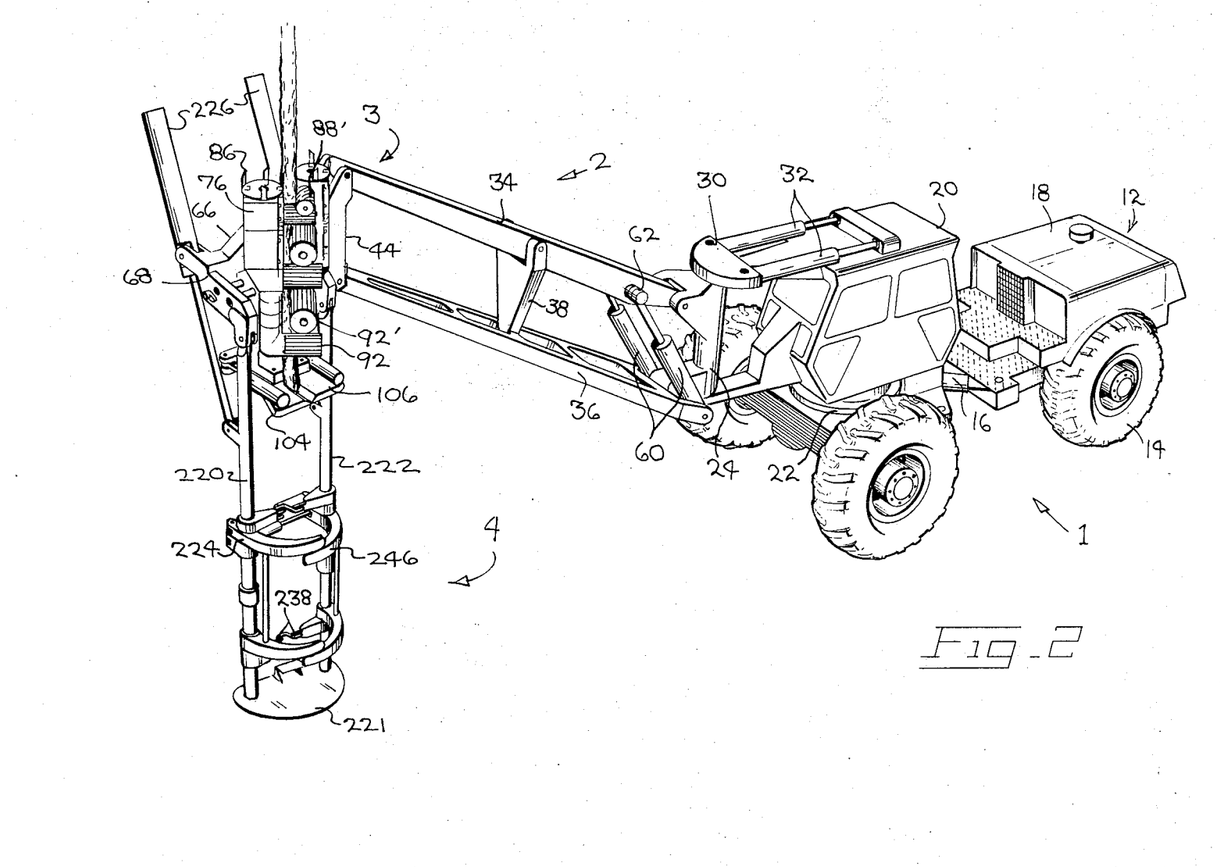
FIG. 2 is a view similar to FIG. 1 but showing the processor in a raised position.

As shown in FIG. 1 the invention includes a high mobility vehicle generally indicated at 1 capable of travelling over difficult terrain in the forest where cutting operations take place. One end of the vehicle 1 supports a head-reach mechanism 2 for reaching out to a tree in a stand thereof, the tree subsequently being grasped and severed from its stump by a processor unit 3 secured to the outer end of the head-reach mechanism. Referring to FIG. 2, a storage means in the form of a magazine 4 is pivotally attached to the processor unit 3 for receiving and collecting eight foot pulpwood bolts as they exit from the processing unit 3. Although the invention is not limited to a specific type of chassis, FIGS. 1 and 2 illustrate the preferred form thereof in a center frame articulated chassis such as that disclosed in Canadian Pat. No. 659,445 of Mar. 12, 1963. Alternately, an articulated chassis of the illustrated type could also utilize a positive traction system as shown in my United States Pat. No. 3,335,810 of Aug. 15th, 1967.

The use of the present invention in tree harvesting operations replaces the manual felling, debranching, cutting to length and bunching at the stump area. Advantageously, however, the machine 1 will operate most economically in combination with one or more stump processors and a forwarder machine, a sample 5 hereof being shown in the background of FIG. 1. The machine 1 may therefore be considered one element in a two machine system (forwarder and stump processor) both machines utilizing a common chassis. When used in this manner, there is no need for having men on the ground during tree harvesting operations.

In accordance with the illustrations of FIGS. 1 and 2, the machine 1 is manoeuvered to a point adjacent a stand of trees and the head-reach mechanism 2 is swung so processor unit 3 is positioned against a tree. The tree is then grasped, severed by the processor and the processor is elevated to its raised position of FIG. 2, the magazine 4 being lowered to an operative position to receive processed bolts from the unit 3. When the magazine is full, the magazine 4 is moved to its FIG. 1 position and the load is deposited at a primary landing 6. The forwarder machine 5 then picks up the bundles of bolts at the primary landings 6 and, when loaded (FIG. 1) transports the load to a secondary landing for transfer to conventional transport.

VEHICLE AND HEAD-REACH MECHANISM

The vehicle portion of machine 1 has fore and aft frame sections 10 and 12 respectively, joined together by an articulated joint preferably of the type shown in my abovementioned Canadian Pat. No. 659,445. Both frame sections 10 and 12 are supported on rubber tires 14, the vehicle being steered by angularly displacing one frame section with respect to the other by means of hydraulic actuators 16 interconnecting frame sections 10 and 12. The rear frame 12 houses a power source 18 for propelling the vehicle 1 and for actuating the head-reach mechanism 2, processing unit 3 and magazine 4 through appropriate power drive.

A control cab 20 is mounted for rotation on front frame 10 by means of a turntable 22. A vertically oriented mast 24 is carried outwardly and forwardly of the cab 20 by upper and lower horizontal supports 26 and 28 respectively. Mast 24 rotates in the supports 26, 28 about a generally vertical axis. Lever arms 30 are secured to the upper end of mast 24 where the latter protrudes through and above the support 26. The ends of the arms 30 are connected to the structure of the cab 20 through a pair of hydraulic actuators 32. It will be appreciated from FIG. 1 that operation of actuators 32 will rotate the mast 24 about its vertical axis and that the head-reach-mechanism 2, processor 3 and magazine 4 directly or indirectly connected to the mast 24 will be swung in a horizontal arc relative to the cab 20.

The head-reach-mechanism 2 is of pantographic layout so that the processor unit 3 is held generally vertical whether it is lowered to the cutting position, FIG. 1, or raised to the processing position, FIG. 2, by the mechanism 2. The head-reach-mechanism includes an upper beam 34 and lower beam 36 maintained in spaced parallel relation. A centrally located spacer 38 is pivotally secured to the upper beam 34 by pins 40 and to the lower beam 36 by pins 42. The outer ends of beams 34 and 36 are spaced by and connected to a sub-frame 44 by upper and lower pins 46 and 48. At the inner ends of the head-reach mechanism 2, beam 34 is pivotally connected by horizontal pins 50 in lugs 52 secured to and extending from the mast 24. The inner end of beam 36 has spaced lugs 54 which are pivotally connected to a mast lug 56 by a horizontal shaft 58. A pair of hydraulic actuators 60 are pivotally secured at their upper ends to pins 62 on either side of the beam 34. At their lower ends actuators 60 are pivotally attached to the shaft 58 intermediate the lugs 54 and the mast lug 56. As is shown in FIGS. 1 and 2, operation of actuators 60 will raise or lower the head-reach-mechanism 2 and the processor unit 3 and magazine 4 secured thereto.

TREE PROCESSOR

Figure 3:
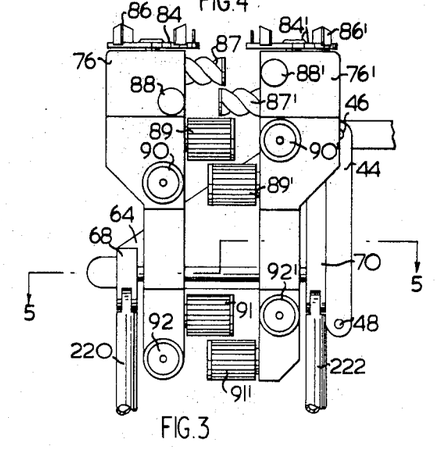
FIG. 3 is a front elevation view of the processor unit shown in FIGS. 1 and 2.
Figure 4:
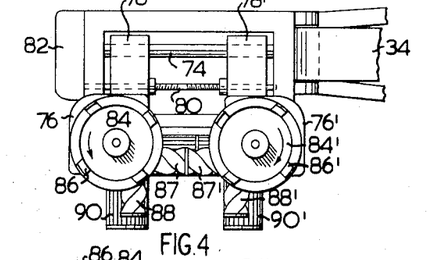
FIG. 4 is a plan view of the processor unit as shown in FIG. 3.
Figure 5:
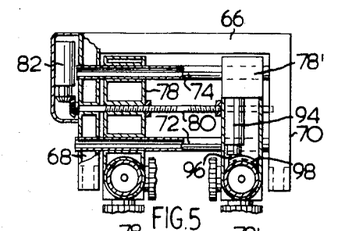
FIG. 5 is a sectional view taken along the line 5—5 of FIG. 3.
Figure 8:
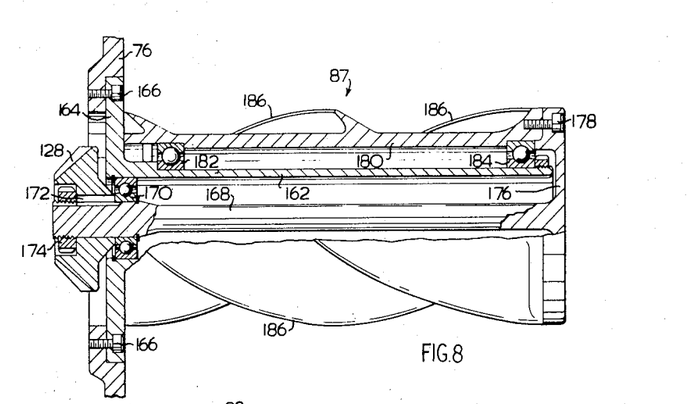
FIGS. 8 and 9 are elevation views, partly in section of a helical cutter and feed roll respectively of the processor unit.
Figure 9:
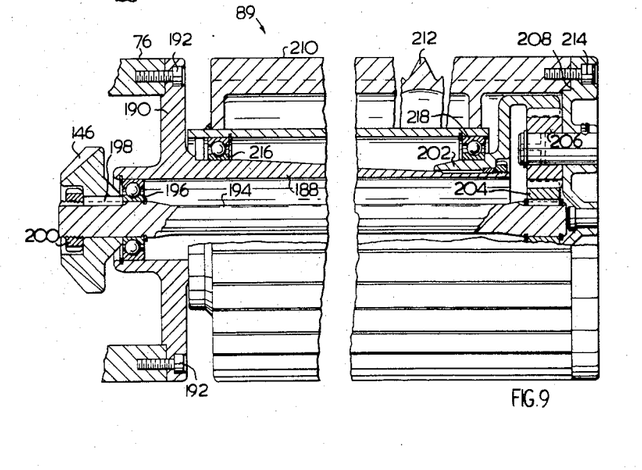
Figure 10:
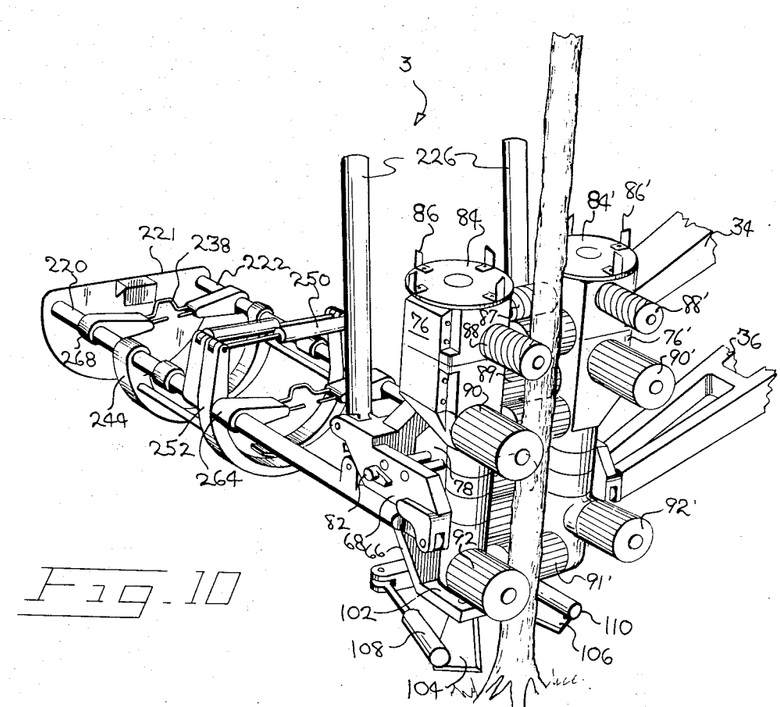
FIG. 10 is an enlarged perspective view of the processor unit in the FIG. 1 position.
Figure 11:
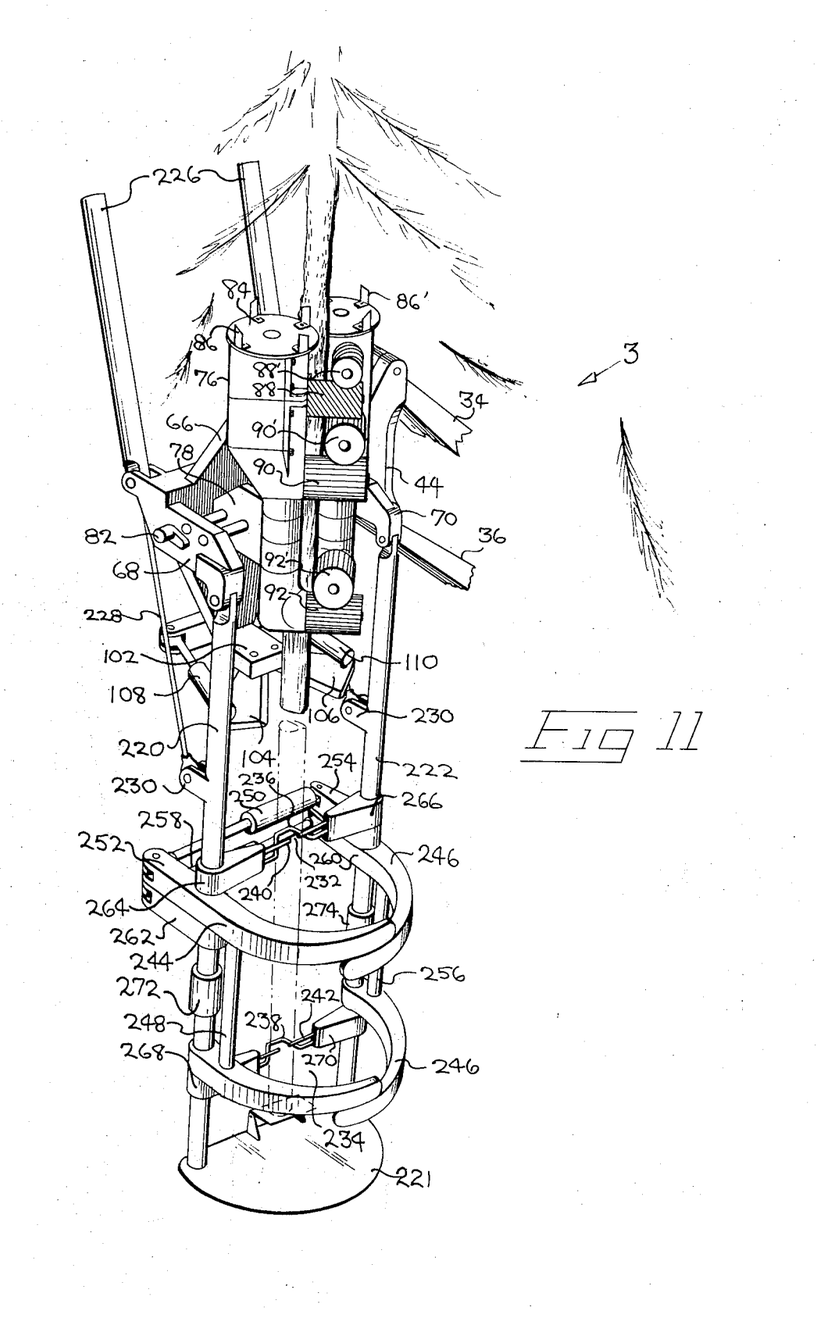
FIG. 11 is an enlarged perspective view of the processor unit in the FIG. 2 position.

The processing unit 3 is structurally illustrated in FIGS. 3–9 and operationally in FIGS. 10 and 11. Referring first to FIGS. 3, 4 and 5 a frame 64. C or U shaped in the plan view of FIG. 4, is secured to the subframe 44 on the outer end of the head-reach-mechanism 2. Frame 64 has a base 66 and side members 68 and 70, the latter being interconnected by two parallel shafts 72 and 74.

Two vertically oriented, parallel processor housings 76, 76' are respectively provided with lugs 78, 78' of box structure (FIG. 5), which are slidably mounted on shafts 72, 74. Additionally each lug is threaded to receive a lead screw shaft 80 rotated by suitable motor means 82. With opposite threads within lugs 78, 78' it will be appreciated that, rotation of screw shaft 80 will reciprocate the lugs 78, 78' and processor housings 76, 76' toward or away from one another along the shafts 72, 74', depending on the direction of rotation of the shaft 80.

Referring to FIG. 3, processor housing 76 includes, on its upper end, a rotary fly cutter 84 having a plurality of circumferentially spaced knives 86 thereon. Rotatably mounted on and projecting from the side surface of the housing 76 are a pair of helical cutters 87, 88; an upper pair of feed rolls 89, 90; and a lower pair of feed rolls 91, 92. It will be noted that housing 76' has an identical number of elements bearing like reference numerals but with prime designations.

In the positions of FIGS. 3–5, the processor housings 76, 76' are "open" to receive a tree therebetween as shown in FIG. 1. In addition to the reciprocal movement afforded by the lead screw shaft 80, each housing 76, 76' must rotate inwardly 45° with respect to one another so as to "close" upon a tree as shown in FIGS. 2, and 11. As illustrated in FIG. 5, lug 78' encloses motor-means 94 having a gear 96. Gear 96 meshes with a gear 98 on the housing 76', when actuated by motor 94 rotates housing 76' through 45°. Lug 78 also includes identical motor-means and associated elements for simultaneously relating housing 76 so that the processor unit assumes the position of FIGS. 2 and 11. As seen in FIGS. 1, 10 and 3–5, when the housings 76, 76' are "open" spiral cutters 87, 87' feed rolls 89, 89', 91 and 91' present a first group of elements with their rotational axis parallel but in a stacked relation one over the other. Spiral cutters 88, 88' and feed rolls 90, 90', and 92 and 92' present a second group of elements, normal to the first group and spaced from one another so that in a plan view such as FIG. 4, all elements form an open C configuration to receive a tree therein as shown in FIGS. 1 and 10.

Referring now to FIGS. 1 and 10, frame 66 has a plate 102 at the lower end thereof to which scissor shears 104, 106 are pivotally secured and which are open and closed by hydraulic actuators 108, 110. After the processor unit 3 has received the tree in its side opening, motors 94 (FIG. 5) are actuated to rotate the housings 76, 76' through 45° so that the spiral cutters and feed rolls on housing 76 all lie normal to the corresponding elements on housing 76' as shown in FIG. 11. Motors 82 then rotate lead screw shaft 80 to bring the housings 76, 76' toward one another whereby the surface of the tree is engaged at eight points about its circumference by feed rolls 89–92'. Shears 104, 106 are then operated by actuators 108, 110 to shear the tree from its stump, the magazine is lowered to its FIG. 2 position and processing of the tree bole then begins as shown in FIG. 11.

Feed rolls 89 to 92' are rotated to draw the bole downwardly along the process path, gripping contact being maintained by constant torque on shaft lead screw 80. Spiral cutters 87–88' are rotated in the opposite direction to remove the branches from the bole, as do the rotating fly cutters 84 which remove branches that could otherwise jam on the heads of the processor housings.

PROCESSOR DETAIL

Figures 6, 7:
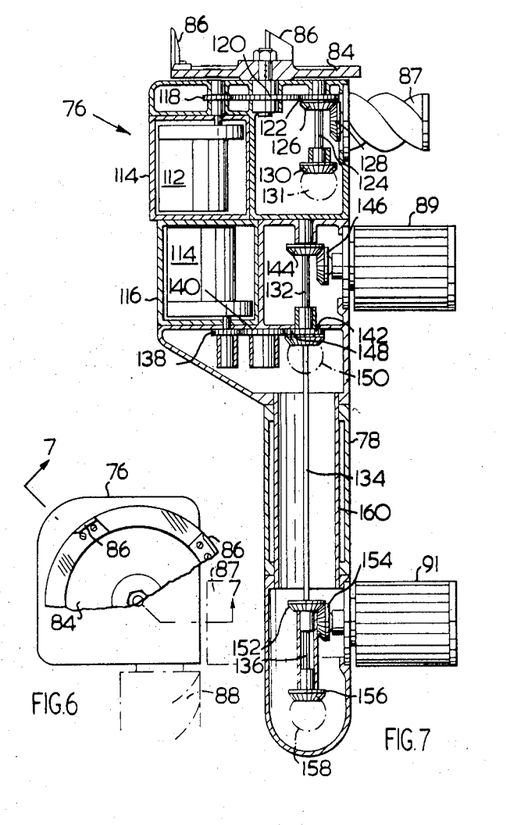
FIG. 6 is a plan view, partly cut away, of one housing of the processor unit shown in FIG. 3.
FIG. 7 is an elevation view in section of one housing of the processor and taken along the lines 7—7 of FIG. 6.

The mechanism for rotating the operative elements of the housings 76, 76' is shown in FIGS. 6 to 9 inclusive. Referring first to FIGS. 6 and 7, processor housing 76 shown in cross section includes a first meter 112, detachably mounted in the housing by a removable box structure 114, and adapted to rotate the fly cutter 84 and spiral cutters 87 and 88. A second motor 116 is removably mounted in the housing by box structure 118 and is adapted to rotate feed rollers 89-92.

First motor 112 drives a spur gear 118 which is in mesh with and rotates a spur gear 120 secured to the fly cutter 84. Gear 120 is in turn in mesh with and rotates a spur gear 122 on a shaft 124 which drives spiral cutter 87 through bevel gears 126 and 128 and also drives cutter 88 (not shown) by means of bevel gears 130 and 131. Three aligned shafts 132, 134 and 136 are rotated by second motor 114 through spur gears 138, 140 and 142. Shaft 132 has a bevel gear 144 which serves to rotate a meshing bevel gear 146 and its feed roll 89. The upper end of shaft 134 rotates feed roll 90, not shown, by bevel gears 148 and 150; and shaft 136 rotates feed roll 91 through bevel gears 152, 154 and also rotates feed roll 92 by bevel gears 156, 158 on its lower end.

It will be observed from FIG. 7 that the upper and lower sections of the housing 76 are joined by a connecting portion 160 which rotatably mounts the housing within the mounting lug 78.

FIG. 8 is a partial cut away view of spiral cutter 87 to illustrate the structure thereof. A sleeve 162 has a flange 164 secured to the housing 76 by bolts 166. A drive shaft 168 is centrally positioned in the sleeve 162 by a ball race 170, bevel gear 128 being secured on the inner end of the shaft by a key 172 and nut 174. The outer end of shaft 168 has an integrally formed flange 176 detachably secured to the spiral cutter by bolts 178 whereby rotation of shaft 168 effects rotation of the cutter. Cutter 87 comprises a cylindrical body 180 rotatably mounted on the sleeve 162 by ball races 182 and 184. The surface of the cylinder 180 has a plurality of helical blades 186 which effect a combined slicing and shearing action in close proximity to the tree bole to remove the branches therefrom.

FIG. 9 is a partial cut away view of feed roll 89, one of the eight such rolls of the processor unit 3. The roll 89 is secured in position by a sleeve 188 having a flange 190 mounted on the housing 76 by bolts 192. A drive shaft 194 is centrally mounted for rotation in the sleeve 188 by a ball race 196, bevel gear 146 being secured to the inner end of shaft 194 by a key 198 and nut 200. The outer end of sleeve 188 has a geared collar 202 secured thereto and the outer end of drive shaft 194 is rotatably mounted in the collar by a sun gear 204 on the end of the shaft 194 and intermeshing planetory gears 206 on an end plate 208. The roll 89 includes a cylindrical body 210 having a plurality of axially extending serations 212 which positively grip the surface of the tree bole. The cylindrical body 210 is secured to the end plate 208 by bolts 214 and is freely mounted on sleeve 188 by inner and outer ball races 216, 218 respectively. It will be understood from FIG. 9 that cylinder 210 of feed roll 89 is rotated by the drive shaft 194 via the gears 204, 206 and end plate 208.

PROCESSED TREE STORAGE MEANS

The magazine 4 is carried by the frame 66 and is operable to two positions, (a) substantially vertical as in FIGS. 2 and 11 while a tree bole is being processed and in which position the magazine receives and stores the processed bolts and (b) substantially horizontal when the processing unit 3 is engaging and severing a tree, FIGS. 1 and 10, or when the magazine is unloading its capacity of bolts (FIG. 17) which is the order of one-third cunit of processed pulpwood.

As shown in FIG. 11, magazine 4 includes two parallel standards 220, 222 pivotally secured at their upper ends to the side members 68, 70 of the frame 66 and at their bottom ends by a plate 221. Frame 66 includes rearwardly projecting lugs 224 which pivotally mount the cylinders of hydraulic actuators 226, the piston rods 228 thereof being pivotally mounted to lugs 230 on the magazine standards 220, 222.

Operation of actuators 226 swing the magazine 4 to the horizontal or vertical positions of FIGS. 10 or 11.

Figure 14:
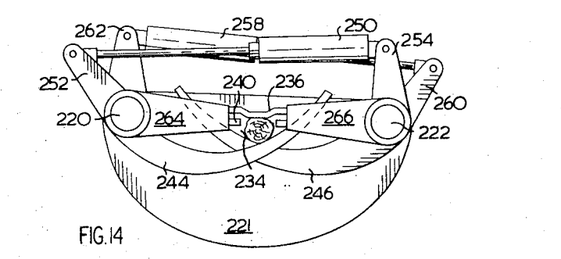
Figure 15:
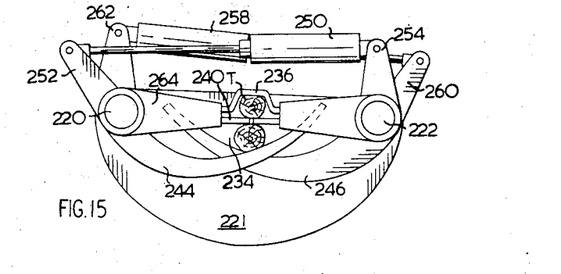
Figure 16:
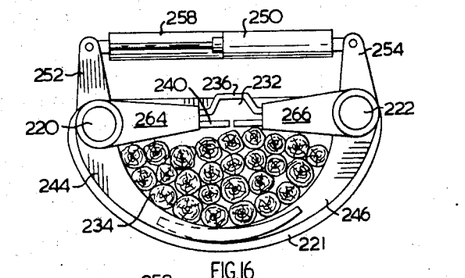
FIG. 16 is a view similar to FIGS. 13-15 and shows the magazine when fully loaded in either vertical or horizontal position.

Referring momentarily to FIG. 16, the magazine 4 is sub-divided into a process path 232 and a storage area 234. FIG. 11 shows that the process path 232, indicated by bolt T shown in phantom line, is defined by upper and lower arcuate feed arms 236, 238 and upper and lower pairs of gate shafts 240, 242. The storage area 234 is defined by the gate shafts 240, 242 and first and second pairs of cradle arms 244 and 246 respectively. Before proceeding with a detailed description of the mechanism for operating the feed arms, gate shafts and cradle arms, it will be appreciated from FIG. 11 that as the tree bole is drawn downwardly by the feed rolls 89-92' and delimbed by the fly cutters 84, 84' and spiral cutters 87–88', it is fed along the process path 232 and is severed by shears 104, 106 at the desired length. From the position of FIG. 13, the feed arms 236, 238 are rotated and the gate shafts 240, 242 are opened (FIG. 14 so that the bolt T is kicked into the storage area 234, the gates and arms sequentially returning to their former positions as shown in FIG. 15.

Figure 13:
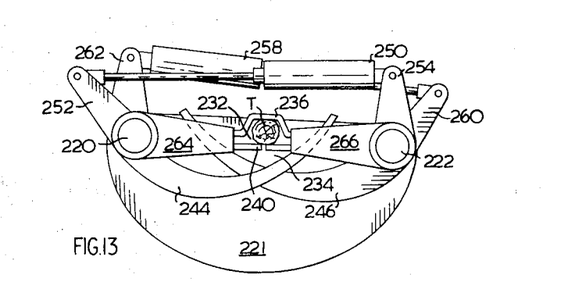
FIGS. 13; 14 and 15 are plan views of the storage magazine in the vertical processing position showing the relationship between the actuating means of FIG. 12 and the cradle arms of the magazine.

Returning to FIG. 11, the first pair of cradle arms 244 are pivotally mounted on standard 220 and are connected together by a member 248. Cradles 244 are operated from a fully closed position, FIG. 13, to a fully open position, FIG. 17, by an actuator 250 pivotally secured at one end to an extension 252 of the upper cradle 244 and at the other end to a stationary arm 254 extending rearwardly from standard 222. In like fashion, upper and lower cradles 246 are connected by a member 256 and are open and closed by an actuator 258 mounted between an extension 260 of upper cradle 246 and a stationary arm 262 extending rearwardly from standard 220. FIGS. 13-15 show that the storage area 234 is enlarged as each bolt is transferred thereto from the process path 232 by the cradles 244, 246 opening slightly. This maintains control over the load in the magazine 4 and may be governed, for example, by feedback hydraulic circuitry between cradle actuators 250, 258 and the means actuating the arcuate feed arms 236.

STORAGE FEED SYSTEM

Figure 12:
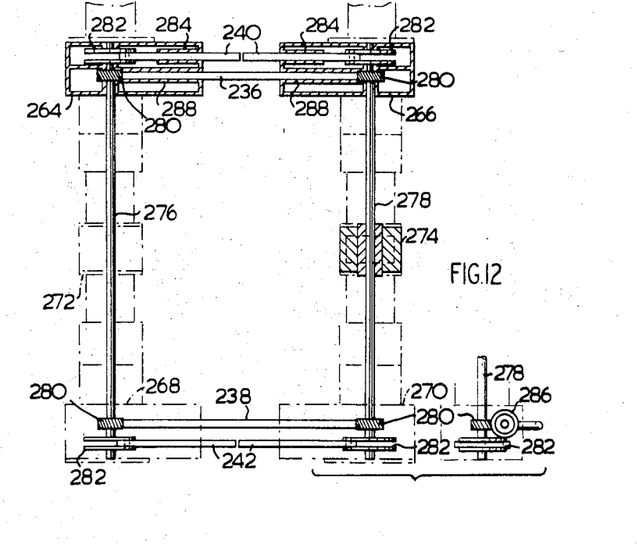
FIG. 12 is an elevation view in cross section of the actuating means for the magazine feed system.
Figure 12A:
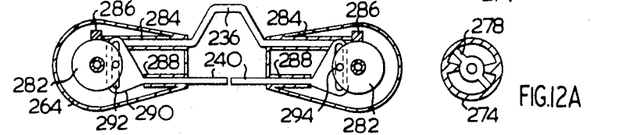
FIGS. 12A to 12C are plan views in cross section of the actuating means of FIG. 11 and illustrate three operative positions of the mechanism.
Figure 12B:
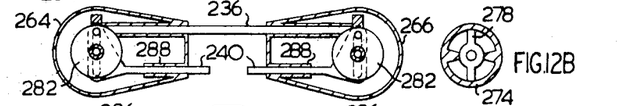
Figure 12C:
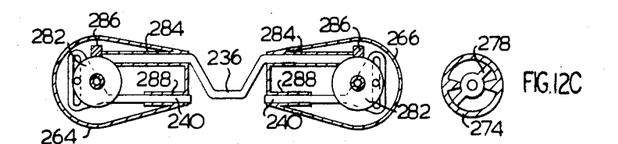

The mechanism for operating the arcuate feed arms 236, 238 and the gate shafts 240, 242 is shown in FIGS. 12 through 12C, FIG. 12 showing standards 220 and 222 in phantom line and enclosing portions of the mechanism.

Feed arm 236 and gate shafts 240 are mounted in a pair of enclosures 264 on standard 220 and 266 on standard 222. The lower feed arm 238 and gate shafts 242 are mounted in enclosures 268 on standard 220 and 270 on standard 222. Hydraulic rotary actuators 272 and 274 (reference FIG. 11) operate the mechanism in the enclosures through drive shafts 276 and 278 extending vertically within the interior of standards 220 and 222 respectively. Each shaft 276 and 278 is secured to the vane of its rotary actuator 272, 274 respectively and is mounted for rotation at each end in enclosures 264-270. In addition, each end of each shaft 276, 278 is provided with a helical gear 280 and a crank 282. The arcuate feed arm 236 is positioned within guides 284 in enclosures 264, 266 and each end of arm 236 has a helical gear 286 in mesh with the gears 280 of shafts 276 and 278.

Gate shafts 240 are mounted for reciprocation in guides 288 of enclosures 264 and 266, the inner end of each shaft 240 having a cam plate 290 with a guide slot 292 therein receiving a crank pin 294 of the crank 282. The description of the mechanism of shafts 240 and feed arm 236 is also applicable to shafts 242 and feed arm 238 and thus will not be repeated. It will be understood from FIGS. 12 through 12C that operation of the rotary actuators 272, 274 rotates drive shafts 276 and 278 which in turn rotate feed arms 236, 238 while at the same time reciprocate gate shafts 240 242. This action of the magazine feed system when a bolt is fed into the process path 232 results in the transfer of the bolt to the storage area 234 as shown in FIGS. 13, 14 and 15. It will be noted from FIG. 14 that as the gate shafts 240 open, the feed arm 236 pushes the bolt through the gate and against the cradle arms 244, 246 which open up to accept the volume of the bolt introduced into the storage area. Reverse rotation of actuators 272, 274 from their FIG. 12C position return the arm 236 to its postion of FIG. 12A and the gate shafts 240 are simultaneously closed and the arm 236 is ready to receive another bolt, FIG. 15.

Figure 17:
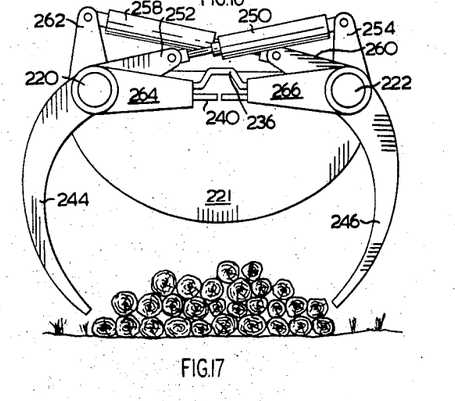
FIG. 17 is a view similar to FIG. 16 but showing the magazine unloading in its horizontal position.

The sequence of FIGS. 13, 14 and 15 is repeated until the magazine 4 is full as shown in FIG. 16. Actuators 226 then raise the magazine to its horizontal position in conjunction with the lowering of the head-reach mechanism 2. By rotating the cab 20 and head-reach mechanism 2 the magazine is unloaded at a primary landing 6 by operation of actuators 250 and 258 as illustrated in FIG. 17.

OPERATIONAL SEQUENCE

1. Processor housings 76 are rotated to their open position FIG. 3, and are spaced wide on shafts 72, 74 by motor 82 and screw shaft 80;
2. Magazine 4 is raised by actuators 226 to its horizontal position, FIGS. 1 and 10;
3. The machine 1 is manoeuvered so that the processor unit 3 is positioned as in FIGS. 1 and 10 and the tree is engaged by the odd numbered spiral cutters and feed rolls 87-91'. The shears 104, 106 are opened and positioned at stump height;
4. Motors 94 rotate housings 76, 76' 45° so that the feed rolls embrace the tree above the stump level; motor 82 and screw shaft 80 draw housings 76, 76' toward one another to center and engage the tree surface at eight locations;
5. Shears 104, 106 are actuated, severing the tree bole from the stump. The head-reach 2 raises the processor unit 3 and the tree bole secured therein, FIG. 2. Actuators 226 lower the magazine to its vertical position with plate 22, placed firmly on the ground by head-reach mechanism 2;
6. Shears 104, 106 are opened, feed rolls 89-92' are rotated, feeding the bole downward along the process path 232; spiral cutters 87-88' and fly cutters 84, 84' are also rotated delimbing the bole as it passes through the processor as shown in FIG. 11;
7. At the desired bolt length shears 104, 106 are actuated to sever the bolt from its bole in the processor, the bolt T dropping to the plate 221 as shown in FIG. 11;
8. Rotary actuators 272, 274 rotate feed arms 236, 238 and open gate shafts 240, 242, transferring bolt to the storage area defined by cradles 244, 246, FIGS. 13-15 and is repeated until the magazine 4 is filled as in FIG. 16.
9. When the magazine is full it is raised to its horizontal position by actuators 226, the machine 1 swings the magazine to a primary landing location and the cradles 244, 246 are opened (FIG. 17) to place their load of pulpwood on the ground in an orderly manner for subsequent recovery by a forwarder machine.

I claim:
1. A method of harvesting trees utilizing a mobile vehicle with a head-reach mechanism and a processor and storage magazine carried by the mechanism, the method comprising the steps of:
   a. engaging a standing tree with the processor;
   b. grasping the tree with the processor and shearing the tree from its stump;
   c. raising the processor, with the tree bole therein, in a vertical plane;
   d. swinging said magazine to a vertical position below said processor;
   e. feeding said tree bole downwardly through the processor to remove the branches from the bole and severing the bole into bolts of a desired length;
   f. sequentially filling said magazine as the bolts are severed;
   g. swinging said magazine to a substantially horizontal position;
   h. lowering said processor and magazine to a position adjacent the ground; and
   i. unloading a plurality of processed bolts from the magazine.
2. A method of harvesting trees comprising the steps of:
   a. grasping a tree in a processor unit and severing the tree from its stump;
   b. raising the processor with the tree bole therein, in a vertical plane;
   c. feeding the severed tree bole vertically downwardly through the processor to debranch said bole;
   d. shearing said bole into bolts of a desired length;
   e. receiving and storing a plurality of said bolts in a generally vertical position as they are vertically processed; and
   f. unloading said plurality of bolts in an orderly arrangement.

\* \* \* \* \*